United States Patent Office 3,751,419
Patented Aug. 7, 1973

3,751,419
BI-ISOQUINOLINONE COMPOUNDS
Erich Ziegler, Graz, Austria, assignor to Ciba-Geigy AG, Basel, Switzerland
No Drawing. Filed Jan. 28, 1971, Ser. No. 110,772
Claims priority, application Switzerland, Feb. 3, 1970, 1,465/70
Int. Cl. C07d 33/46
U.S. Cl. 260—288 R
2 Claims

ABSTRACT OF THE DISCLOSURE

Bi-isoquinolinones of formula:

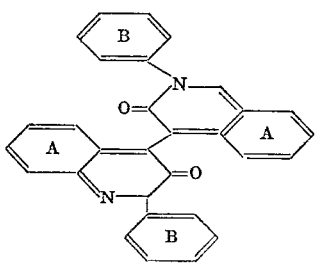

(I)

wherein the rings A and B can be further substituted by halogen, nitro, lower alkyl or lower alkoxy, and the rings A can contain a condensed benzene ring, are useful for coloring plastics in fluorescent yellow to red shades.

---

Fluorescent dyestuffs which can be used in synthetic materials are known. There is, however, a need for such dyestuffs having better fastness to light, heat, and weather, and, in particular, for such dyestuffs which are more deeply coloured. Surprisingly, success has now been achieved in producing a new class of materials containing compounds which can serve as intensely fluorescent dyestuffs for the dyeing of synthetic materials in fluorescent yellow to red shades. The dyeings have very good fastness to light, heat, and weather. The new compounds correspond to Formula I:

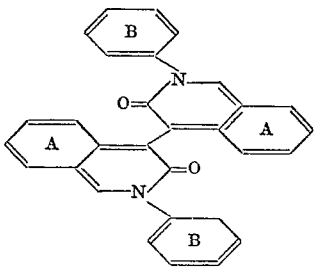

(I)

wherein the rings A and B can be non-ionogenically substituted. Suitable substituents of the rings A and B are acylamino, ester, carbonamido groups, preferably, however, halogens, nitro, alkyl or alkoxy groups. The new compounds are produced according to the invention by reacting a compound of Formula III:

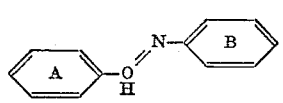

(III)

wherein the rings A and B can be non-ionogenically substituted with a mono- or dihalogensuccinic acid, with fumaric acid, maleic acid, acetylenedicarboxylic acid, or with a functional derivative of one of these acids in the molar ratio 1:2.

In particular, such bi-isoquinolinones are suitable for the dyeing of synthetic materials, and are also relatively simple to produce, which correspond to Formula II:

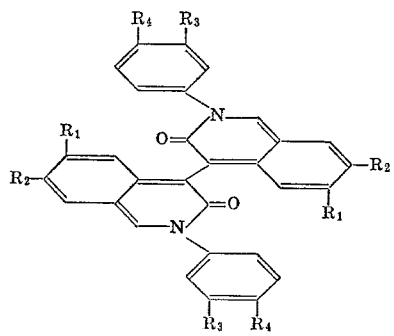

(II)

wherein $R_1$ and $R_2$ represent, independently of each other, hydrogen, chlorine, bromine, nitro, methyl or methoxy; $R_3$ represents hydrogen, chlorine, bromine or nitro; and $R_4$ represents hydrogen, chlorine or bromine; and wherein $R_1$ and $R_2$ can also form a 6-membered condensed ring. The most simple preferred compounds correspond to Formula II wherein the radicals $R_1$–$R_4$ represent hydrogen.

The bi-isoquinolinones of Formula II are obtained according to the invention by compounds of Formula IV:

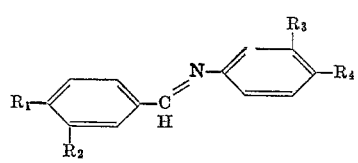

(IV)

wherein $R_1$ and $R_2$ represent, independently of each other, hydrogen, chlorine, bromine, nitro, methyl or methoxy, $R_3$ represents hydrogen, chlorine, bromine or nitro, and $R_4$ represents hydrogen, chlorine or bromine, and $R_1$ together with $R_2$ can also form a 6-membered condensed ring, being reacted with mono- or dihalogensuccinic acid, fumaric acid, maleic acid, acetylenedicarboxylic acid, or with a halide of one of these acids in the molar ratio of 2:1 in the presence of an inert organic solvent.

Preferably, the acid chloride is used, especially monobromosuccinic acid chloride, or fumaric acid chloride. Suitable solvents are halides and nitrated aromatic hydrocarbons such as chlorobenzene, particularly o-dichlorobenzene, nitrobenzene, o-chloronitrobenzene, or also dimethylformamide. The reaction is performed preferably at temperatures between 100 and 150° C. The starting materials for the production of the new bi-isoquinolinones are known.

The new compounds are distinguished by a relatively high melting point and by negligible solubility in the usual organic solvents. The crystalline products are yellow to red in colour and, when dissolved in solvents such as dimethylformamide or nitrobenzene, exhibit an intense fluorescence. They impart to synthetic materials such as polystyrene, polymethacrylate, polyesters, and polycarbonates, in which they are dissolved, strong brilliant greenish yellow to red dyeings which are distinguished by surprisingly good fastness to light, heat, and weather.

The temperatures are given in degrees centigrade in the following examples.

EXAMPLE 1

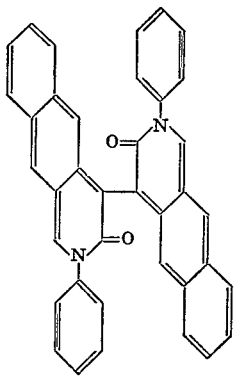

An amount of 9.24 g. of β-naphthaldehydeanil is dissolved in 35 ml. of nitrobenzene, and 4.7 g. of bromosuccinic acid dichloride are added. Heating is then applied during the course of 4 hours, with good stirring, to an oil-bath temperature of 140°, and stirring continues.

After cooling, the precipitated red-yellow product of the above given formula is filtered off, and washed with methanol. It is then dried at 80–90° in vacuo. The product crystallises from dimethylformamide in the form of red-yellow crystals.

When the product is processed into a synthetic material granulate such as polycarbonate, polystyrene, polymethacrylate or polyester granulate, sheets are obtained which are dyed in a fluorescent red-yellow shade having fastness to light, heat, and weather.

EXAMPLE 2

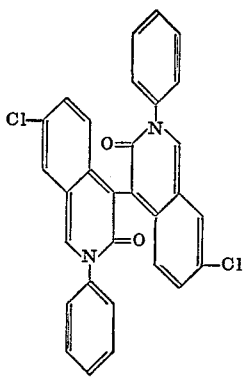

To a suspension of 8.62 g. of 3-chlorobenzaldehydeanil in 40 ml. of o-chlorobenzene is added a solution of 4.7 g. of bromosuccinic acid dichloride in 10 ml. of o-dichlorobenzene. The whole is then heated, with stirring, to a temperature of 115–120°, and this temperature is maintained for 4 hours. After cooling to room temperature, the precipitated yellow product of the above given formula is filtered off, and well washed with methanol. The product is dried at 100° in vacuo.

Processed into synthetic materials, the product imparts to these a brilliant yellow shade having fastness to light and to weather.

EXAMPLE 3

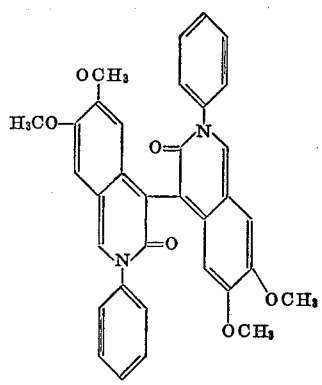

An amount of 2.38 g. of thionyl chloride is added dropwise, with ice cooling, to 20 ml. of dimethylformamide; and thereafter are added 4.82 g. of 3,4-dimethoxy-benzalaniline and 1.16 g. of maleic acid. The suspension is then heated in 30 minutes to an oil-bath temperature of 140°, and stirred for a further 4 hours.

After cooling to room temperature, the precipitated orange-red product of the above given formula is filtered off, well washed with methanol, and dried at 100°.

When the product is worked into polymethylacrylic acid methyl ester, brilliant reddish yellow dyed sheets are obtained, the dyeings of which are fast to light and to weather.

If 3,4-dimethoxy-benzalaniline is replaced by equivalent amounts of one of the benzaldehydeanils listed in the following Table 1, with the procedure as described in Example 3, then compounds are obtained having the shade in polymethacrylic acid methyl ester given in the last column.

TABLE 1

$R_1$—〈 〉—CH=N—〈 〉—$R_4$ (with $R_2$ on first ring, $R_3$ on second ring)

| Example number | $R_1$ | $R_2$ | $R_3$ | $R_4$ | Colour |
|---|---|---|---|---|---|
| 4 | H | H | H | H | Yellow. |
| 5 | Cl | H | H | H | Do. |
| 6 | NO$_2$ | H | H | H | Red. |
| 7 | OCH$_3$ | H | H | H | Reddish yellow. |
| 8 | H | NO$_2$ | H | H | Do. |
| 9 | H | H | Cl | H | Greenish yellow. |
| 10 | H | H | NO$_2$ | H | Reddish yellow. |
| 11 | Cl | H | H | Cl | Yellow. |
| 12 | CH$_3$ | H | H | H | Do. |

EXAMPLE 13

An amount of 0.5 g. of the dyestuff produced according to Example 1 is thoroughly mixed in a mixing drum with 1000 g. of polystyrene granulate. The granulate, thus dyed on the surface in the dry state, is processed on a screw injection moulding machine of the type V 14–60 (Ankerwerke Nürnberg) at 200°. In this manner are obtained fluorescent red-yellow sheets. The dyeings have very good fastness to light and to weather.

EXAMPLE 14

An amount of 1000 g. of polymethacrylic acid methyl ester (injection moulding granulate), and 0.5 g. of the dyestuff produced according to Example 6 are thoroughly mixed together in a mixing drum on a roller device with a roller speed of 70 revolutions per minute for 10 minutes. The dry-dyed granulate is then processed on a screw injection moulding machine at 250°. In this manner are obtained fluorescent red sheets. The dyeings are fast to heat, light, and weather.

EXAMPLE 15

An amount of 0.5 g. of the dyestuff produced according to Example 9 and 1000 g. of polyester granulate of 1–2 mm. diameter, as described in Example 14, are thoroughly mixed together. The dyed granulate is processed at 270° in a screw injection moulding machine. The obtained fluorescent green-yellow sheets have very good fastness to light and to weather.

EXAMPLE 16

An amount of 1000 g. of polycarbonate and 0.5 g. of the dyestuff produced according to Example 3 are mixed together in a mixing drum, as described in Example 14. The granulate, thus dyed on the surface in the dry state, is then processed in a screw injection moulding machine at 300°. In this manner are obtained fluorescent, intensely reddish yellow sheets. The dyeing have very good fastness to heat, light, and weather.

What I claim is:
1. Bi-isoquinolinones of the formula:

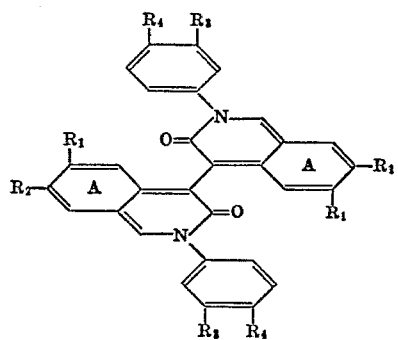

(II)

wherein $R_1$ and $R_2$ represent, independently of each other, hydrogen, chlorine, bromine, nitro, methyl or methoxy or $R_1$ and $R_2$ may form with two adjacent carbon atoms of ring A a benzene ring, $R_3$ represents hydrogen, chlorine, bromine or nitro; and $R_4$ represents hydrogen, chlorine or bromine.

2. Bi-isoquinolinone as claimed in claim 1 wherein $R_1$, $R_2$, $R_3$ and $R_4$ represent hydrogen.

References Cited
UNITED STATES PATENTS

| | | | |
|---|---|---|---|
| 2,777,845 | 1/1957 | Oken | 260—288 R |
| 2,759,936 | 8/1956 | Speeter | 260—283 S Y |
| 3,631,050 | 12/1971 | Elscauer | 260—283 S Y |
| 3,624,087 | 1/1971 | Beck | 260—283 S Y |

DONALD G. DAUS, Primary Examiner

U.S. Cl. X.R.

252—301.2; 260—37, 41, 283 S Y, 283 B I